Patented May 25, 1937

2,081,876

UNITED STATES PATENT OFFICE 2,081,876

DIARYL OXIDE SULPHONIC ACIDS AND PROCESSES FOR PREPARING THE SAME

Milton A. Prahl, Milwaukee, Wis., assignor to E. I. du Pont de Nemours & Company, Wilmington, Del., a corporation of Delaware No Drawing. Application February 25, 1935, Serial No. 8,110

10 Claims. (Cl. 260—150)

This invention relates to the preparation of a new class of surface-active agents which exhibit wetting, dispersing, emulsifying and detergent properties. These compounds may be considered as derivatives of diphenyl oxide and have the general formula

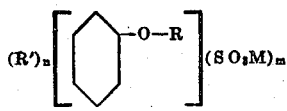

wherein R represents a phenyl or naphthyl radical which does not contain a chromophore group, R' represents a hydroaromatic or aliphatic radical containing more than 2 carbon atoms, M represents hydrogen or a metallic atom or metallic acting radical (such as NH$_4$), $m$ stands for a number from 1 to 3, and $n$ stands for a number from 1 to 5.

The nucleus of this series of compounds comprises diphenyl oxide and its higher analogues, such as phenoxy diphenyl oxide and naphthyl phenyl oxide, which do not contain chromophore groups.

These new surface-active agents may be prepared in several ways. The diphenyl oxide may be sulphonated and then condensed with a sulphuric acid ester of an aliphatic or cycloaliphatic (hydroaromatic) alcohol. Sulphuric acid esters of the aliphatic or hydroaromatic compounds may be prepared from the alcohols or from the corresponding unsaturated hydrocarbons by reacting upon them with a sulphating agent such as sulphuric acid, chlorosulphonic acid, or sulphur trioxide. The diphenyl oxide or other phenyl aryl oxides may be sulphonated separately or together with the alkyl or cycloalkyl compound; for example, a mixture of diphenyl oxide and the desired alcohol may be treated with an excess of sulphuric acid at relatively low temperatures. The temperature is then raised to from 30 to 90° C., at which temperature the condensation takes place and the alkyl diphenyl oxide sulphonic acid is produced. A mixture of diphenyl oxide and the alcohol or unsaturated hydrocarbon may be reacted with only sufficient chlorosulphonic acid to sulphate the alkyl compound at a low temperature. By raising the temperature of the mass, condensation of the alkyl group and the diphenyl oxide is effected with simultaneous sulphonation of the diphenyl oxide nucleus. In this case, the alkyl or cycloalkyl sulphate acts as the sulphonating agent.

Unsaturated hydrocarbons, for instance the terpene hydrocarbons and the unsaturated petroleum distillates of the aliphatic series, may be condensed with diphenyl oxide, naphthyl phenyl oxide or phenoxy diphenyl oxide in the presence of a sulphonating agent to give the same compounds that are obtained from the corresponding alcohols, for as well known, these unsaturated aliphatic and cycloaliphatic (hydroaromatic) hydrocarbons react with sulphuric acid to form the sulphuric acid esters.

The secondary alcohols, which readily yield the unsaturated hydrocarbons when their acid sulphates are heated, condense with diphenyl oxide readily. The primary alcohols require somewhat higher temperatures and in most cases disulphonated or trisulphonated products are produced. Secondary alcohols with 2 alcoholic hydroxyl groups may also be condensed with diphenyl oxide in a similar manner.

The sulphonated condensation product usually separates from the reaction mixture as a viscous liquid, paste or solid, and is readily separated from the waste acid liquor. It may be converted to the alkali-metal salt after separation by diluting the mass with water and neutralizing with an alkali such as sodium, potassium, or ammonium hydroxide, carbonate, etc. The neutralized products may be used as aqueous or alcoholic pastes or they may be dried in vacuum at about 100° C. and pulverized to obtain them in powdered form. In some cases, however, the dried salts are viscous pastes. In cases where separation of the condensation product does not readily take place, the entire reaction mixture may be poured into brine and cooled, and the precipitated product filtered off and neutralized.

The products may be purified by extraction with alcohol and/or benzene or other organic solvents, the extract being filtered to free it from inorganic salts and then evaporated to give the surface-active product in pure form.

I find that tertiary alcohols do not themselves yield soluble condensation products, but mixtures of branched chain alcohols containing tertiary and secondary or primary alcohols may be condensed, in which case the tertiary alcohols polymerize during the condensation, forming an oil which contains the emulsifying condensation product in solution. This mixture has valuable emulsifying properties. It yields a soap-like milky solution with water, the insoluble polymer being in the dispersed phase and the soluble condensation product derived from the secondary or primary alcohols acting as the emulsifier.

The following examples are given to more fully illustrate my invention. The parts are by weight.

Example 1

84 parts of diphenyl oxide are stirred mechanically and held at 30–35° while 187 parts of 100% sulphuric acid are slowly added during 1½ hours. When completed, this mixture constitutes the "diphenyl oxide sulphonation".

120 parts of anhydrous isopropyl alcohol (or 132 parts 90%) are stirred mechanically and held at 0° to 15° C. while 280 parts of 100% sulphuric acid are slowly added during approximately 1½ hours. This solution constitutes the "alcohol sulphation".

The "alcohol sulphation" is now added, during a period of about 10 minutes, to the "diphenyl oxide sulphonation", with mechanical agitation, at a temperature of 25 to 30° C. The mixture is now heated slowly to 35° C. The mixture heats spontaneously at this point if the vessel is not too cool. The temperature is held below 40° by cooling. The mixture is now stirred for 12 hours at 30 to 40° C.

The mass is permitted to separate in layers and the lower layer of waste acid is drawn off and discarded. The viscous upper layer consists mainly of poly-isopropyl diphenyl oxide sulphonic acid.

The free acid may be diluted with water to form a paste and neutralized with caustic alkalies or ammonia. The neutralized paste may be stored as such or dried in a vacuum dryer at 100° C.

The product is soluble in water, dilute alkalies and acids, and the organic portion of the product dissolves in organic solvents such as alcohol or benzene.

It possesses excellent foaming, wetting, dispersive and emulsifying properties and also has detergent properties.

Example 2

140 parts of secondary butyl alcohol are condensed with sulphonated diphenyl oxide, as in Example 1, and the product, consisting mainly of tri-sec. butyl diphenyl oxide sulphonic acid, is isolated in the same manner. It is obtained in good yields. It may be worked up into its alkali salts as in Example 1.

The product is an exceptionally powerful detergent, wetting, foaming and emulsifying agent.

Example 3

176 parts of sec. butyl carbinol are treated as in Example 1, yielding a product consisting mainly of poly (sec. butyl methyl) diphenyl oxide sulphonic acid. It possesses properties similar to those of the product of Example 2.

Example 4

176 parts of methyl-n-propyl carbinol are treated as in Example 1, yielding about 130–150 parts of a product consisting mainly of poly (methyl-n-propyl methyl) diphenyl oxide sulphonic acid. The dry sodium salt is readily soluble in water. It is an excellent detergent, wetting and emulsifying agent.

Example 5

176 parts of diethyl carbinol are treated as in Example 1, yielding a product consisting mainly of poly (diethyl methyl) diphenyl oxide sulphonic acid. The sodium salt resembles the methyl-n-propyl methyl derivative in appearance and exhibits similar highly developed surface-active properties in solution.

Example 6

100 parts of cyclohexanol are sulphated as in Example 1 with 140 parts of 100% sulphuric acid. The sulphated alcohol is then condensed with 84 parts of diphenyl oxide which has been sulphonated at 30–35° C. with 187 parts of sulphuric acid. Condensation is conducted at 30 to 35° for 3 hours, and proceeds very rapidly. The product, consisting mainly of dicyclohexyl diphenyl oxide sulphonic acid, separates rapidly as a yellowish, very viscous mass, which, after separation from waste acid, is neutralized as in Example 1. The product is soluble in water and forms intensely foaming solutions. It is a very powerful detergent and emulsifying agent.

Example 7

200 parts of cyclohexanol are treated as in Example 6. The product, consisting mainly of tetracyclohexyl diphenyl oxide sulphonic acid, is obtained in excellent yields. It is a good emulsifying agent.

Example 8

171 parts of a technical mixture of methyl cyclohexanols, consisting mainly of the o- and p-methyl isomers, are treated as in Example 6. The product, tri (methyl cyclohexyl) diphenyl oxide sulphonic acids, resembles the cyclohexyl derivative obtained in Example 7.

Example 9

A mixture of 84 parts of diphenyl oxide and 120 parts of anhydrous isopropyl alcohol is held at 18 to 22° C. with agitation while adding slowly 232 parts of chlorosulphonic acid over a period of 3 hours. The temperature is slowly raised to 40°. A spontaneous rise in temperature to 45–50° usually occurs at this point. The mixture is stirred at 50° for 12 hours and is then permitted to separate into layers. The lower waste acid layer is drawn off and discarded; the upper layer of poly-isopropyl diphenyl oxide sulphonic acid is obtained in excellent yields. It is worked up as in Example 1.

Example 10

A mixture of 84 parts of diphenyl oxide and 111 parts of sec. butyl alcohol is reacted with 174 parts of chlorosulphonic acid as in Example 9. The temperature is raised to 25° C. and held for 3 hours; it is then raised to 40° C. and held for 12 hours. The product, poly (sec. butyl) diphenyl oxide sulphonic acid, is isolated as in Example 9.

Example 11

A mixture of 84 parts of diphenyl oxide and 132 parts of methyl-n-propyl carbinol is reacted with 174 parts of chlorosulphonic acid and is condensed and isolated as in Example 10. The poly (methyl-n-propyl methyl) diphenyl oxide sulphonic acid is obtained in good yields.

Example 12

A mixture of 84 parts of diphenyl oxide and 140 parts of n-butyl alcohol is reacted with chlorosulphonic acid and is condensed at 65° C. for 12 hours. The entire mass is poured into double its volume of 15% salt solution, stirred, cooled to 20°, and filtered. The cake is slurried with water, neutralized with sodium hydroxide and dried. The product, which is a disulphonic acid, is highly soluble in water and the solutions foam intensely.

Example 13

132 parts of n-amyl alcohol are reacted as in Example 12. A similar product is obtained.

Example 14

A mixture of 42 parts of diphenyl oxide and 58 parts of n-heptyl alcohol are reacted with 58 parts of chlorosulphonic acid and condensed at 50° C. for 24 hours. 98 parts of 100% sulphuric acid are then added at 25° C. and heating at 50° is continued for 12 hours. The product is isolated as in Example 12. The product consists mainly of di-n-heptyl diphenyl oxide disodium disulphonate, mixed with inert inorganic salts. It is a highly soluble foaming and emulsifying agent.

Example 15

A mixture of 84 parts of diphenyl oxide and 111 parts of sec. butyl alcohol is held at a temperature of 20 to 25° C. while slowly adding 245 parts of 100% sulphuric acid. The condensation is conducted at 40° for 12 hours; the product is isolated as in Example 1. It consists mainly of tri-sec. butyl diphenyl oxide sulphonic acid and is obtained in higher yields than those obtained by using the method outlined in Example 2.

Example 16

A mixture of 84 parts of diphenyl oxide and 154 parts of borneol is reacted as in Example 15 with 317 parts of 100% sulphuric acid. The product is isolated by the usual procedure.

Example 17

A mixture of 84 parts of diphenyl oxide and 195 parts of mixed branched chain alcohols (from methanol synthesis) (B. P. 140–155°) is reacted as in Example 15 with 317 parts of sulphuric acid. The sodium salt of the sulphonated condensation product, dissolved in the insoluble condensation product, is obtained as an oil which is a good emulsifying agent.

Example 18

84 parts of diphenyl oxide, mixed with 100 parts of cyclohexanol, are reacted with 257 parts of sulphuric acid as in Example 15.

Example 19

29 parts of hexahydrohydroquinone mixed with 84 parts of diphenyl oxide and 100 parts of tetrachlorethane are reacted with 187 parts of 100% sulphuric acid. The product is isolated as usual; after separation of the waste acid the neutralized mass is distilled for removal of the solvent tetrachlorethane and is dried.

Example 20

Fenchyl alcohol is condensed, using the same quantities given in Example 16. A similar product is obtained.

Example 21

A mixture of 42 parts of diphenyl oxide with 34 parts of dipentene is reacted with 98 parts of 100% sulphuric acid as in Example 15. The sodium salt is obtained as a yellow solid.

Example 22

34 parts of terpinolene are reacted as in Example 21. A similar product is obtained.

Example 23

34 parts of pinene or oil of turpentine are reacted as in Example 21, giving a similar product.

Example 24

A mixture of 84 parts of diphenyl oxide and 150 parts of gasoline obtained by a cracking process and containing mixed unsaturated aliphatic hydrocarbons is treated with 240 parts of 100% sulphuric acid at 20° C., following by condensation with thorough stirring at 40° C. for 20 hours. The gasoline remaining unreacted is removed by vacuum distillation after neutralization of the mass, or it may be separated directly by permitting the mass to separate and drawing off. A water soluble product of high foaming and emulsifying power is obtained.

Example 25

A suspension of 21.8 parts of phenyl alpha-naphthyl oxide in 30 parts of isopropyl alcohol is held at 20° while slowly adding 98 parts of 100% sulphuric acid. The condensation is conducted at 40° C. for 12 hours. The poly-isopropyl phenyl naphthyl oxide sulpho acid separates as a solid dark brown mass. It is worked up into sodium salt by the usual method. This compound is an excellent emulsifier and has marked wetting out properties.

Example 26

26 parts of p-phenoxy diphenyl oxide are reacted with 30 parts of isopropyl alcohol, using 98 parts of sulphuric acid, as in Example 25. The product is soluble in water and has foaming and emulsifying power.

As illustrated by the above examples, sulphonation of the diphenyl or other aryl phenyl oxide forming the nucleus of the compound may be carried out either before or after the condensation with the alkyl or cycloalkyl compound, or the sulphonation may be effected during the condensation. While sulphuric acid monohydrate is usually specified in the examples, sulphuric acid as low as 93% may be used. Where sulphur trioxide is used, the diphenyl oxide and alcohol may be mixed and the sulphur trioxide passed into the solution. Preferably the alcohol is treated with sulphur trioxide in tetrachlorethane or other inert solvent and the diphenyl oxide reacted in that solution to effect condensation and sulphonation of the diphenyl oxide nucleus.

The processes as illustrated in the above examples are subject to variation. In general temperatures of from 30–90° are satisfactory for carrying out the condensation. The use of higher temperatures generally yields disulphonation and trisulphonation products. Large excesses of sulphonating agent may be used but a certain minimum is necessary for completing the reaction. The particular amount necessary will vary of course, depending upon the particular alcohols used. The reaction may be carried out in the presence of inert solvents such as tetrachlorethane. The reactants may be introduced in any order, that is, the diphenyl oxide may be added to a mixture of alcohol and an excess of sulphonating agent if desired, and it is immaterial whether the sulphuric acid ester of the aliphatic or cycloaliphatic series is derived from a primary or secondary alcohol or from an unsaturated hydrocarbon. For instance, as disclosed above, the unsaturated hydrocarbons contained in gasoline may be converted into the mixed sulphuric acid esters and the mixture condensed with diphenyl oxide. The use of large excesses of sulphated alcohol is possible if it is desired to introduce the maximum number of alkyl or cycloaliphatic groups.

Many of the products described above have exceptionally high wetting properties and also exhibit excellent detergent, dispersing and emulsifying power. Others, particularly those higher in the series, have good emulsifying properties and are less effective as wetting agents or detergents.

They are useful wherever their peculiar surface activity is to be desired, for instance, in the textile industry as washing and wetting out agents or dyeing assistants; in insecticidal spray mixtures or for the removal of spray residues from fruits, etc.; in the treating of leather, paper, fabrics, etc.; in disinfecting and antiseptic mixtures where penetration is desired; in froth flotation of ores; in the de-emulsification of petroleum-water emulsions; as dispersing agents in chemical and dyestuff manufacture, and also as intermediates for the preparation of new chemical compounds.

I claim:

1. Diaryl oxide sulphonic acids of the formula:

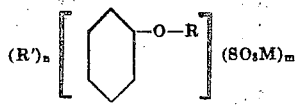

wherein R represents a radical of the group consisting of phenyl and naphthyl radicals which contain no chromophore groups, R' represents a radical of the class consisting of unsubstituted hydroaromatic and aliphatic radicals containing more than two carbon atoms, M represents a member of the group consisting of hydrogen, an alkali metal and the ammonium radical, $m$ stands for a number from 1 to 3 and $n$ stands for a number from 1 to 5, which compounds may be obtained by sulphonating and condensing in any order a diphenyl oxide which contains no chromophore groups with a compound of the class consisting of unsubstituted hydroaromatic and aliphatic sulphates containing more than two carbon atoms.

2. Diphenyl oxide sulphonic acids of the formula

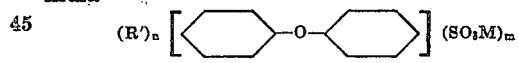

wherein R' represents a radical of the group consisting of unsubstituted hydroaromatic and aliphatic radicals containing more than two carbon atoms, M represents a member of the group consisting of hydrogen, an alkali metal and the ammonium radical, $m$ stands for a number from 1 to 3 and $n$ stands for a number from 1 to 5, which compounds may be prepared by sulphonating and condensing in any order diphenyl oxide and a compound of the class consisting of unsubstituted aromatic and aliphatic sulphates containing more than two carbon atoms.

3. An iso-alkyl diphenyl oxide sulphonic acid alkali salt of high wetting power containing no chromophore groups, which may be obtained by sulphonating and condensing in any order diphenyl oxide and an unsubstituted isoalkyl sulphate containing more than two carbon atoms.

4. Tri-isopropyl diphenyl oxide monosodium sulphonate, which may be obtained by sulphonating and condensing in any order diphenyl oxide and isopropyl sulphate with subsequent neutralization of the acid compound with sodium hydroxide.

5. A hydroaromatic hydrocarbon substituted diphenyl oxide alkali metal sulphonate containing no chromophore groups, which may be obtained by sulphonating and condensing in any order diphenyl oxide and a hydroaromatic sulphate.

6. Dicyclohexyl diphenyl oxide sodium sulphonate, which may be obtained by sulphonating and condensing in any order diphenyl oxide and cyclohexyl sulphate with subsequent neutralization of the acid compound with sodium hydroxide.

7. The process for preparing surface-active compounds which comprises sulphonating and condensing in any order a diphenyl oxide which contains no chromophore groups with a compound of the class consisting of hydroaromatic and aliphatic sulphates containing more than 2 carbon atoms and which contain no substituents.

8. The process for preparing surface-active compounds which comprises sulphonating and condensing, in any order, diphenyl oxide with a compound of the class consisting of unsubstituted hydroaromatic and unsubstituted aliphatic sulphates containing more than 2 carbon atoms.

9. The process for preparing surface-active compounds which comprises sulphonating and condensing, in any order, diphenyl oxide with an unsubstituted aliphatic sulphate containing more than 2 carbon atoms.

10. The process for preparing surface-active compounds which comprises sulphonating and condensing, in any order, diphenyl oxide with an unsubstituted isoaliphatic sulphate containing from 3 to 5 carbon atoms.

MILTON A. PRAHL.